Oct. 2, 1923.
W. H. REMSEN
TRUCK HOIST
Filed June 12, 1920
1,469,732
2 Sheets-Sheet 1
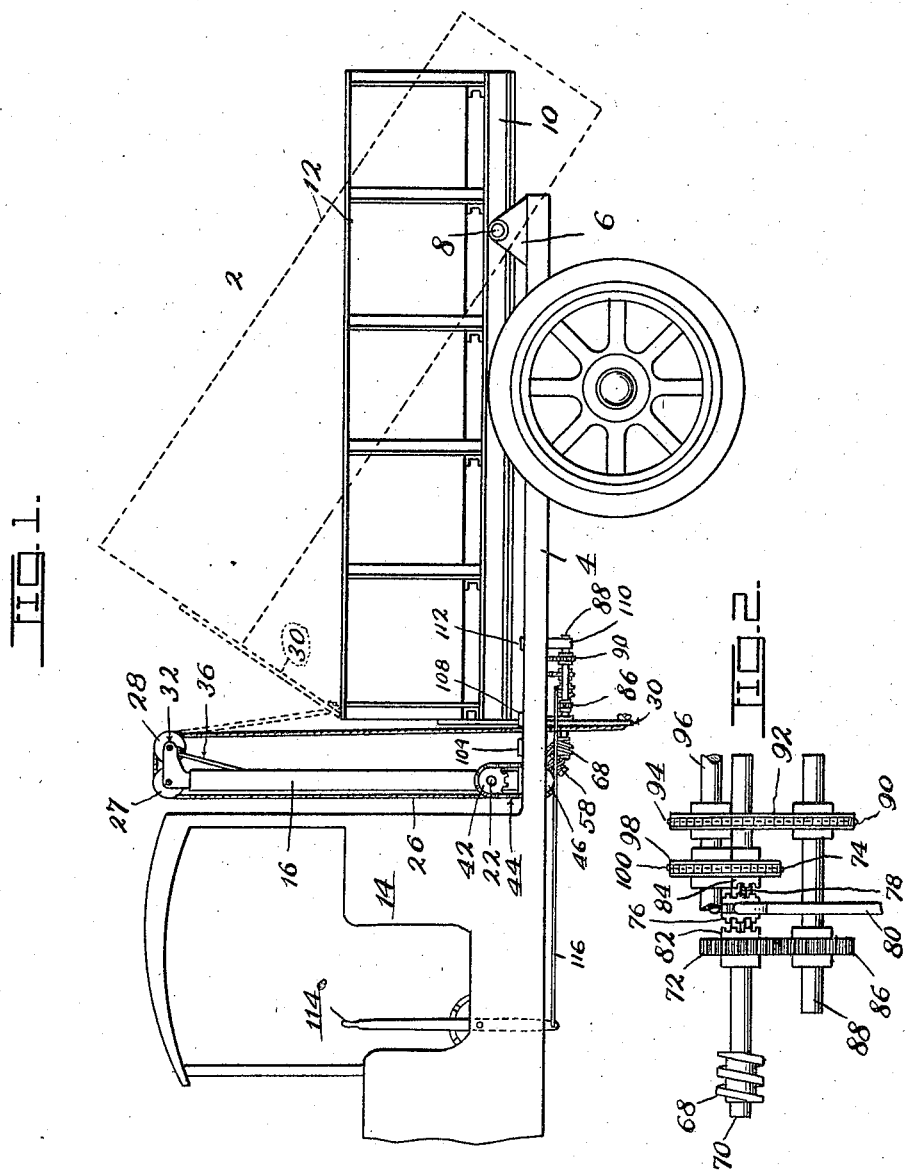
Witness:
Rred G. Rischer.
Inventor:
William H. Remsen,
By F. G. Fischer, Atty.

Oct. 2, 1923.
W. H. REMSEN
TRUCK HOIST
Filed June 12, 1920
1,469,732
2 Sheets-Sheet 2
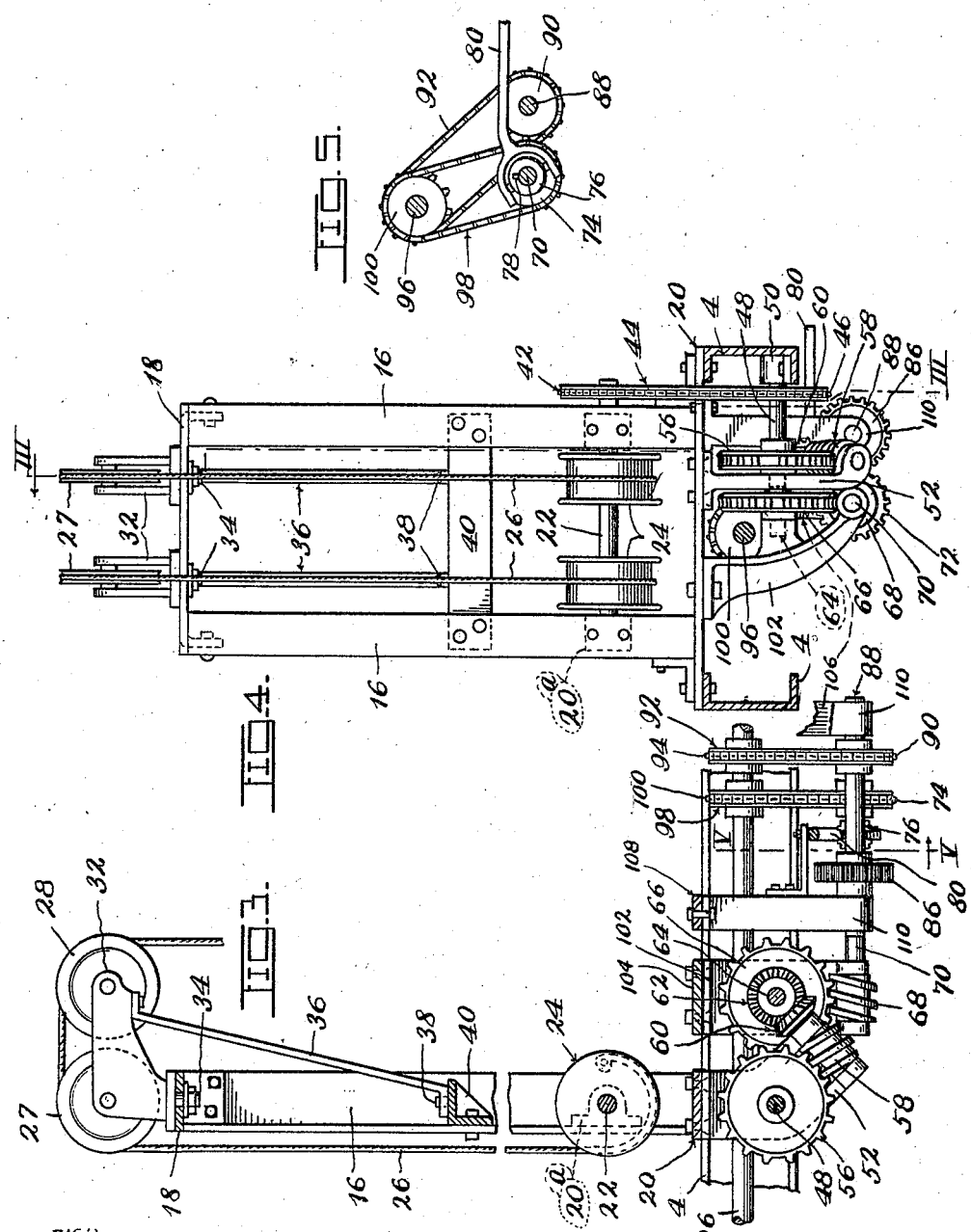
Witness:
Fred G. Fischer.
Inventor:
William H. Remsen
By F. G. Fischer, atty Patented Oct. 2, 1923.

1,469,732

UNITED STATES PATENT OFFICE.

WILLIAM H. REMSEN, OF KANSAS CITY, MISSOURI, ASSIGNOR OF ONE-HALF TO GEORGE HEINEMANN, OF KANSAS CITY, MISSOURI.

TRUCK HOIST.

Application filed June 12, 1920. Serial No. 388,551.

*To all whom it may concern:*

Be it known that I, WILLIAM H. REMSEN, a citizen of the United States, residing at Kansas City, in the county of Jackson and State of Missouri, have invented certain new and useful Improvements in Truck Hoists, of which the following is a specification.

My invention relates to hoists for raising truck bodies to an inclined position to facilitate the unloading of material, and one object is to provide a compact power actuated hoist which can be readily installed on a motor truck and which is simple in construction and efficient in operation.

Other objects will hereinafter appear, and in order that the invention may be fully understood, reference will now be had to the accompanying drawings, in which:

Fig. 1 is a broken side elevation of a truck equipped with the hoist.

Fig. 2 is a fragmentary plan view of certain gears constituting a part of the hoist.

Fig. 3 is an irregular vertical sectional view of the hoist on line III—III of Fig. 4.

Fig. 4 is a front elevation of the hoist.

Fig. 5 is a section on line V—V of Fig. 3, with some of the parts removed.

Referring now in detail to the various parts, 2 designates a motor truck of ordinary construction having a chassis embodying two longitudinal sills 4 provided at their rear ends with oppositely-disposed bearings 6 in which trunnions 8 are rockably mounted. The trunnions 8 are fixed to a pair of longitudinal beams 10, upon which the truck body 12 is firmly mounted. The truck body 12 terminates a short distance from the rear of the driver's seat 14, leaving space in which the hoist is mounted.

In constructing the hoist, I employ a pair of standards 16 united at their upper ends by a transverse bar 18 and fixedly mounted at their lower ends upon a transverse bar 20, which in turn is rigidly secured upon the sills 4 of the chassis.

The standards 16 are provided near their lower ends with bearings 20ª, in which a shaft 22 is journaled. Said shaft 22 is provided with a pair of fixedly-mounted drums 24 to which the lower ends of a pair of cables 26 are attached. If desired one long drum may be substituted for the two short drums shown on the drawings. The cables 26 extend upwardly from the drums 24 over sheaves 27 and 28, and thence downwardly to a pair of arms 30 to the lower ends of which said cables are attached as shown on Fig. 1. The arms 30 are rigidly secured to the front end of the truck body 2.

Each pair of sheaves 27 and 28, are mounted in a bracket 32 having a pivot 34 swiveled in the transverse bar 18. The rear free end of each bracket 32 is supported by a brace 36 pivotally mounted at its lower end upon a stud 38, arranged in axial alinement with the pivot 34 and mounted upon a support 40 connected at its ends to the standards 16. By providing each bracket 32 with a pair of sheaves 27 and 28, the cables 26 extend in substantially a vertical plane from the rear sheaves 28 to the arms 30 and exert a more direct lift on the body 12 than if said cables extended at an angle from the sheaves 27 to the arms 30, and hence less power is required to lift said body 12 to dumping position. By pivoting the brackets 34 as above stated the sheaves 27 and 28 may adjust themselves to the angle of the cables 26 and the lower ends of the latter may be attached to arms 30 placed closer together or farther apart as the case may be, on different truck bodies, without danger of said cables 26 running off the sheaves 27 and 28.

The drum shaft 22 is provided with a fixedly-mounted sprocket wheel 42, which is driven by an endless sprocket chain 44 extending downwardly and around another sprocket wheel 46 fixedly mounted upon a shaft 48 journaled at one end in a bearing 50 fixed to the adjacent sill 4 of the chassis and journaled at its opposite end in a hanger 52 depending from the underside of the transverse bar 20.

The shaft 48 in addition to carrying the sprocket wheel 46 is provided with a rigidly mounted worm wheel 56, which intermeshes with a worm 58 provided with a fixedly mounted bevel gear 60 intermeshing with another bevel gear 62, mounted upon a shaft 64 provided with a fixedly mounted worm wheel 66 intermeshing with a worm 68 fixedly mounted upon a counter shaft 70 provided with a loosely mounted cog wheel 72, a loosely mounted sprocket wheel 74 and a clutch member 76, which latter is slidable upon said shaft 70 but caused to rotate therewith through the intermediacy of a feather 78. The clutch member 76 is adapted to be alternately shifted through the intermediacy of a lever 80 into engagement with a clutch member 82 on the cog wheel 72 and into engagement with a clutch member 84 on the sprocket wheel 74, to drive the shaft 70 in opposite directions to effect the raising and lowering of the truck body 12.

The cog wheel 72 is driven in one direction by a cog wheel 86 fixed upon a countershaft 88 provided with a fixedly-mounted sprocket wheel 90 driven by an endless sprocket chain 92 running around a sprocket wheel 94 fixedly mounted upon the engine or propeller shaft 96 of the truck. The sprocket wheel 74 is driven in a reverse direction to the cog wheel 72 by an endless chain 98, which is driven by a sprocket wheel 100 fixed upon the shaft 96.

The worm 58 is journaled in the lower end of the hanger 52. The shaft 64 is journaled at one end in a hanger 102 and at its opposite end in a bearing (not shown) similar to the bearing 50 and secured to one of the sills 4. The hanger 102 is secured to a transverse bar 104 fixed to the top of the sills 4. The shaft 70 is journaled in the hanger 102 and a hanger 106, which latter is secured to the underside of a transverse bar 108 fixed to the upper side of the sills 4. The shaft 88 is journaled in hangers 110 one of which is secured to the underside of the bar 108 and the other to the underside of a bar 112 fixed to the top of the sills 4. The clutch lever 80 is arranged to be operated from the driver's seat 14 by a lever 114 and a connecting rod 116, so that the driver will not have to leave the seat to raise and lower the body 12.

With the parts arranged as shown and described, it will be understood that when the lever 114 is shifted in one direction the drums 24 will be rotated by the shaft 96 through the intermediacy of the intervening gearing to wind up the cables 26 and adjust the body 12 to dumping position as disclosed by dotted lines on Fig. 1, and by shifting the lever 114 in an opposite direction the drums 24 will unwind the cables 26 and permit the body 12 to move downwardly to the full line position. By employing the worm gears 56, 58, 66 and 68, the body 12 may be held in dumped position or lowered without the use of brakes, ratchets, etc., which are apt to permit the body to violently descend from dumping position and cause damage to the truck or the hoisting apparatus.

While I have shown and described the hoisting mechanism in combination with the bed and frame of a vehicle, it is to be understood that said hoisting mechanism could be used for other purposes without departing from the spirit and scope of the claim.

Having thus described my invention, what I claim and desire to secure by Letters Patent, is:

The combination of a motor vehicle having a chassis and a body pivoted at one end to said chassis, of two sprocket wheels fixed to the propeller shaft of the vehicle motor, a countershaft, 88, paralleling the propeller shaft, a sprocket wheel fixed on said countershaft and driven by one of the sprocket wheels on the propeller shaft through the intermediacy of a chain, a second countershaft paralleling the propeller shaft, a sprocket wheel loosely mounted upon said second countershaft and provided with a clutch member, a sprocket chain for driving the last-mentioned sprocket wheel from the other sprocket wheel on the propeller shaft, a gear wheel fixed to the countershaft, 88, a gear wheel loosely mounted upon the second countershaft to drive the same in a reverse direction from that in which it is driven by the sprocket wheel mounted thereon, a clutch member on the last-mentioned gear wheel, an intermediate clutch member having a feather connection with the second countershaft and adapted to be alternately shifted into engagement with the aforementioned clutch members, mechanism for shifting the intermediate clutch member into engagement with either of the companion clutch members to effect rotation of the second countershaft in opposite directions, a worm fixed to the second countershaft, a worm wheel driven by said worm, a bevel gear driven by the worm wheel, a second bevel gear driven by the first bevel gear, an inclined shaft on which said second bevel gear is fixedly mounted, a worm also fixedly mounted on said inclined shaft, a worm wheel driven by the last-mentioned worm, and a sprocket wheel fixed on the shaft of the last-mentioned worm wheel and adapted to drive hoisting mechanism for raising and lowering the vehicle body, substantially as shown and described.

In testimony whereof I affix my signature, in the presence of two witnesses.

WILLIAM H. REMSEN.

Witnesses:
F. G. FISCHER,
L. J. FISCHER.